United States Patent
Chang

(10) Patent No.: US 7,139,138 B2
(45) Date of Patent: Nov. 21, 2006

(54) LENS DEVICE

(75) Inventor: Mei-Pin Chang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/247,782

(22) Filed: Oct. 11, 2005

(65) Prior Publication Data

US 2006/0181787 A1    Aug. 17, 2006

(30) Foreign Application Priority Data

Feb. 17, 2005    (TW) ............................... 94104623 A

(51) Int. Cl.
    *G02B 7/02* (2006.01)
(52) U.S. Cl. .................. 359/827; 359/819; 359/811
(58) Field of Classification Search ............ 359/827, 359/819, 821, 822, 829, 830, 811, 818
    See application file for complete search history.

(56) References Cited

U.S. PATENT DOCUMENTS 6,813,093 B1 *  11/2004  Takagi et al. ............... 359/700

\* cited by examiner

*Primary Examiner*—Timothy Thompson
(74) *Attorney, Agent, or Firm*—Ladas & Parry LLP

(57) ABSTRACT

A lens device includes a lens barrel, a lens, a guiding unit, and a positioning unit. The lens barrel has a barrel axis. The lens has a lens axis and is disposed between the lens barrel and the positioning unit. The guiding unit includes guiding studs and guiding slots formed on the lens barrel and the lens, wherein the guiding slots receive the guiding studs respectively therein and have dimensions larger than those of the guiding studs. The positioning unit has outer and inner ring sections. The outer ring section has a ring axis and is sleeved on the lens barrel. The inner ring section engages the lens such that the lens axis forms a radial offset with the ring axis, wherein the lens is positioned relative to the barrel axis by the inner ring section according to angular orientation of the inner ring section relative to the ring axis.

10 Claims, 12 Drawing Sheets

LENS DEVICE

CROSS-REFERENCE TO RELATED APPLICATION

This application claims priority of Taiwanese Application No. 094104623, filed on Feb. 17, 2005.

BACKGROUND OF THE INVENTION

1. Field of the Invention

The invention relates to a lens device, more particularly to a lens device provided with a positioning unit that facilitates axis correction of a lens.

2. Description of the Related Art

As shown in FIG. 1 and FIG. 2, a lens device 10 includes a lens barrel 11, and fixed lenses 12, 13 and a primary lens 14 disposed in the lens barrel 11. Since the primary lens 14 has the most sensitive optical characteristics, it is disposed in an outermost end of the lens barrel 11 to facilitate correcting of the position of the primary lens 14 for achieving optimum optical characteristics for the lens device 10. This process is referred to as "axis correction."

To perform axis correction, the lens device 10 is first mounted on a standard lens device 20 having a plurality of standard lenses 21. When light rays 22 pass through the fixed lenses 12, 13 and the primary lens 14 of the lens device 10, as well as the standard lenses 21 of the standard lens device 20, an image is formed on an imaging region 23. Next, a plurality of lens-adjusting claws 30 are inserted between the lens barrel 11 and the primary lens 14 to move the primary lens 14 in radial directions until the image formed on the imaging surface 23 is clearest. When the axis correction is completed, an adhesive 16 is injected into the gap 15 between the lens barrel 11 and the primary lens 14 to fix the primary lens 14 in the lens barrel 11.

Although axis correction can be performed for the aforesaid lens device 10, the following shortcomings are encountered:

1. A larger conventional lens device 10 presents no difficulty when using the lens-adjusting claws 30 to perform axis correction. However, as required dimensions for lens devices become smaller due to advancements in technology, the alignment-adjusting claws 30 become difficult to operate, thereby resulting in inefficient and inaccurate axis correction.

2. Due to pressure differences, the adhesive 16 can easily flow onto an effective area of the primary lens 14, thus resulting in adverse effects on the optical characteristics of the lens device 10. When the adhesive 16 flows onto the effective area of the primary lens 14, not only do the lens barrel 11 and the primary lens 14 require cleaning, but the axis correction also needs to be restarted, thereby resulting in inefficient axis correction.

3. Due to the gap 15 present between the lens barrel 11 and the primary lens 14, the primary lens 14 can easily dislocate from its corrected position due to the fluidity of the adhesive 16. When dislocation of the primary lens 14 occurs, the axis correction needs to be restarted, thereby making the axis correction process inefficient.

SUMMARY OF THE INVENTION

Therefore, the object of the present invention is to provide a lens device that is capable of overcoming the aforesaid short comings.

According to the present invention, there is provided a lens device that includes a lens barrel, a lens, a guiding unit, and a positioning unit.

The lens barrel confines a barrel hole that extends along a barrel axis, and has an end barrel section. The end barrel section has an end surface disposed radially relative to the barrel axis, an inner peripheral surface extending from the end surface parallel to the barrel axis, and a lens-abutting surface extending from the inner peripheral surface in radial inward directions relative to the barrel axis. The lens-abutting surface cooperates with the inner peripheral surface to configure the barrel hole with a lens-receiving compartment.

The lens has a lens axis, and first and second lens portions opposite to each other along the lens axis and formed respectively with first and second lens surfaces. The first lens portion is disposed in the lens-receiving compartment such that the first lens surface abuts against the lens-abutting surface. The first lens portion has a radial dimension smaller than that of the inner peripheral surface. The second lens portion further has a lens peripheral surface that extends from the second lens surface along the lens axis.

The guiding unit includes a set of guiding studs formed on one of the first lens surface and the lens-abutting surface and spaced apart angularly from each other, and a set of guiding slots formed in the other of the first lens surface and the lens-abutting surface and spaced apart angularly from each other. The guiding slots receive the guiding studs respectively therein and have dimensions larger than those of the guiding studs.

The positioning unit has an outer ring section and an inner ring section formed in the outer ring section. The outer ring section has a ring axis, and is sleeved on the end barrel section of the lens barrel such that the ring axis is aligned with the barrel axis. The inner ring section engages the lens peripheral surface of the second lens portion such that the lens axis forms a radial offset with the ring axis. The position of the lens in the lens-receiving compartment relative to the barrel axis is controlled by the inner ring section according to angular orientation of the inner ring section relative to the ring axis.

BRIEF DESCRIPTION OF THE DRAWINGS

Other features and advantages of the present invention will become apparent in the following detailed description of the preferred embodiments with reference to the accompanying drawings of which.

DETAILED DESCRIPTION OF THE PREFERRED EMBODIMENTS

Figure 1:
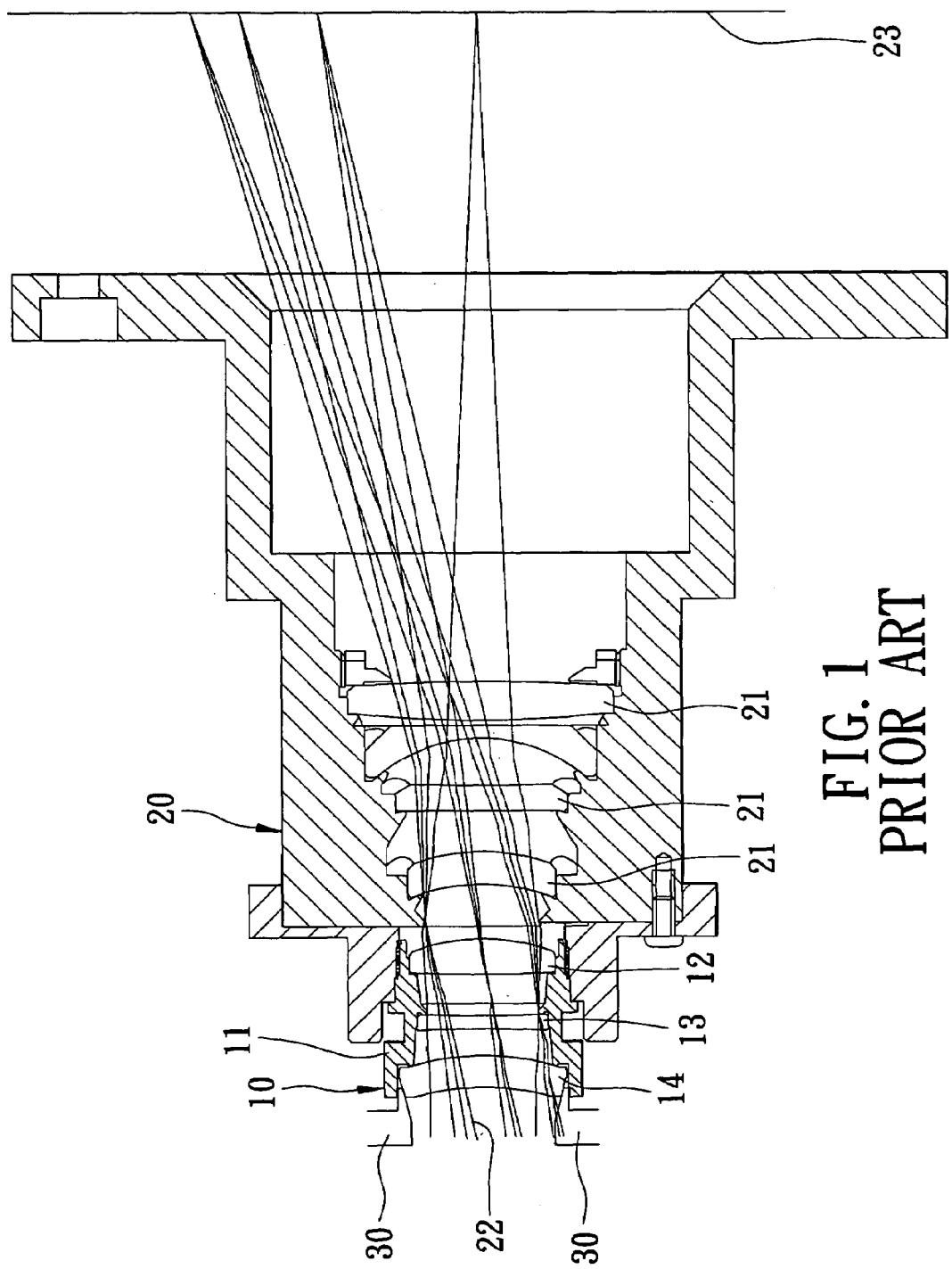
FIG. 1 is an assembled partly sectional view of a conventional lens device mounted on a standard lens device during axis correction.
Figure 2:
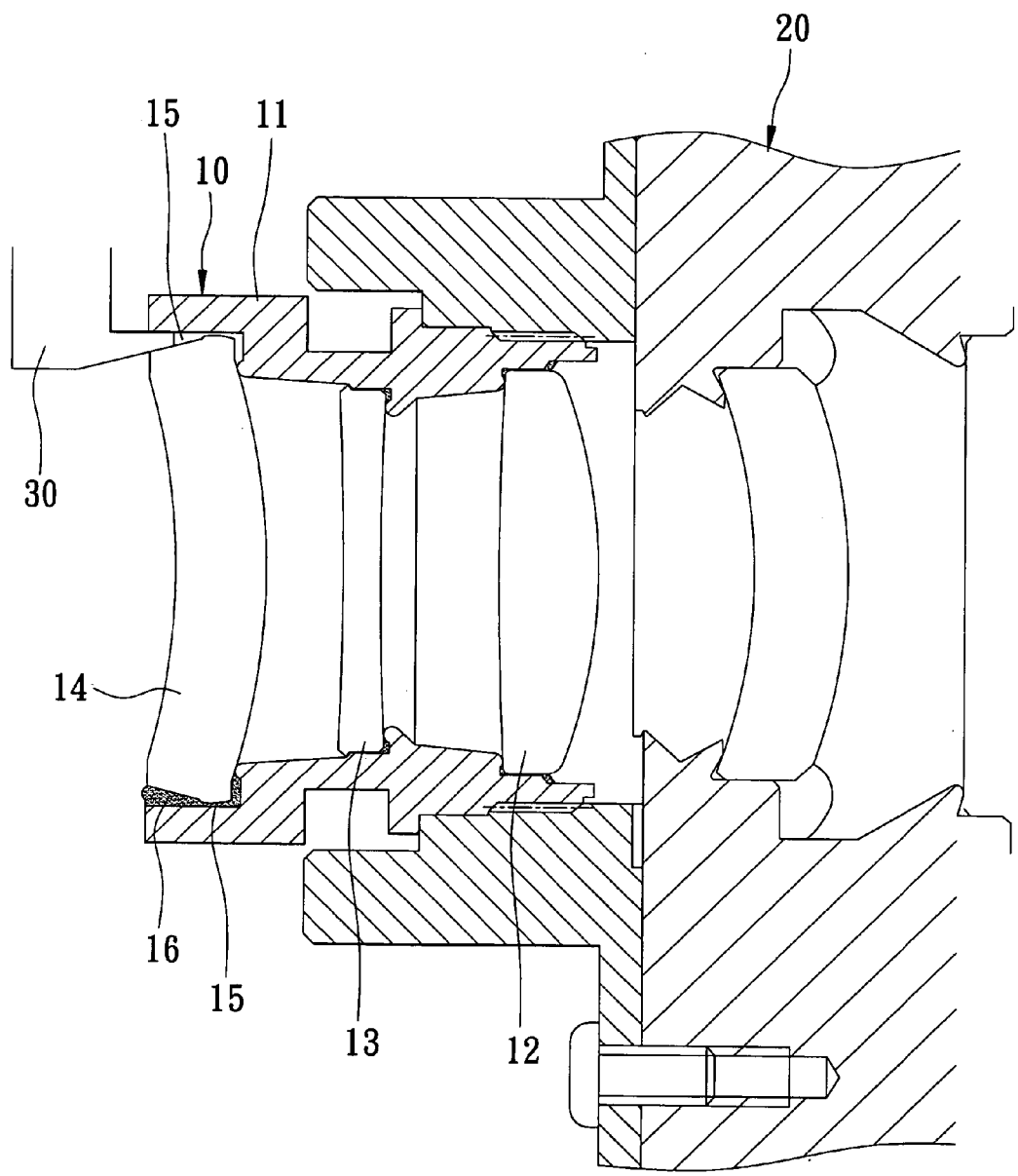
FIG. 2 is an assembled partly sectional view of the conventional lens device, illustrating the injection of an adhesive to secure a lens upon completion of axis correction.

Before the present invention is described in greater detail, it should be noted herein that like elements are denoted by the same reference numerals throughout the disclosure.

As shown in FIGS. 3 to 6, the first preferred embodiment of a lens device according to the present invention includes a lens barrel 40, a lens 50, a guiding unit 60 disposed between the lens barrel 40 and the lens 50, and a positioning unit 70 sleeved on the lens barrel 40.

The lens barrel 40 confines a barrel hole 43 that extends along a barrel axis 400, and has an end barrel section 42. The end barrel section 42 has an end surface 421 disposed radially relative to the barrel axis 400, an inner peripheral surface 422 extending from the end surface 421 parallel to the barrel axis 400, and a lens-abutting surface 423 extending from the inner peripheral surface 422 in radial inward directions relative to the barrel axis 400. The lens-abutting surface 423 cooperates with the inner peripheral surface 422 to configure the barrel hole 43 with a lens-receiving compartment 431.

Figure 6:
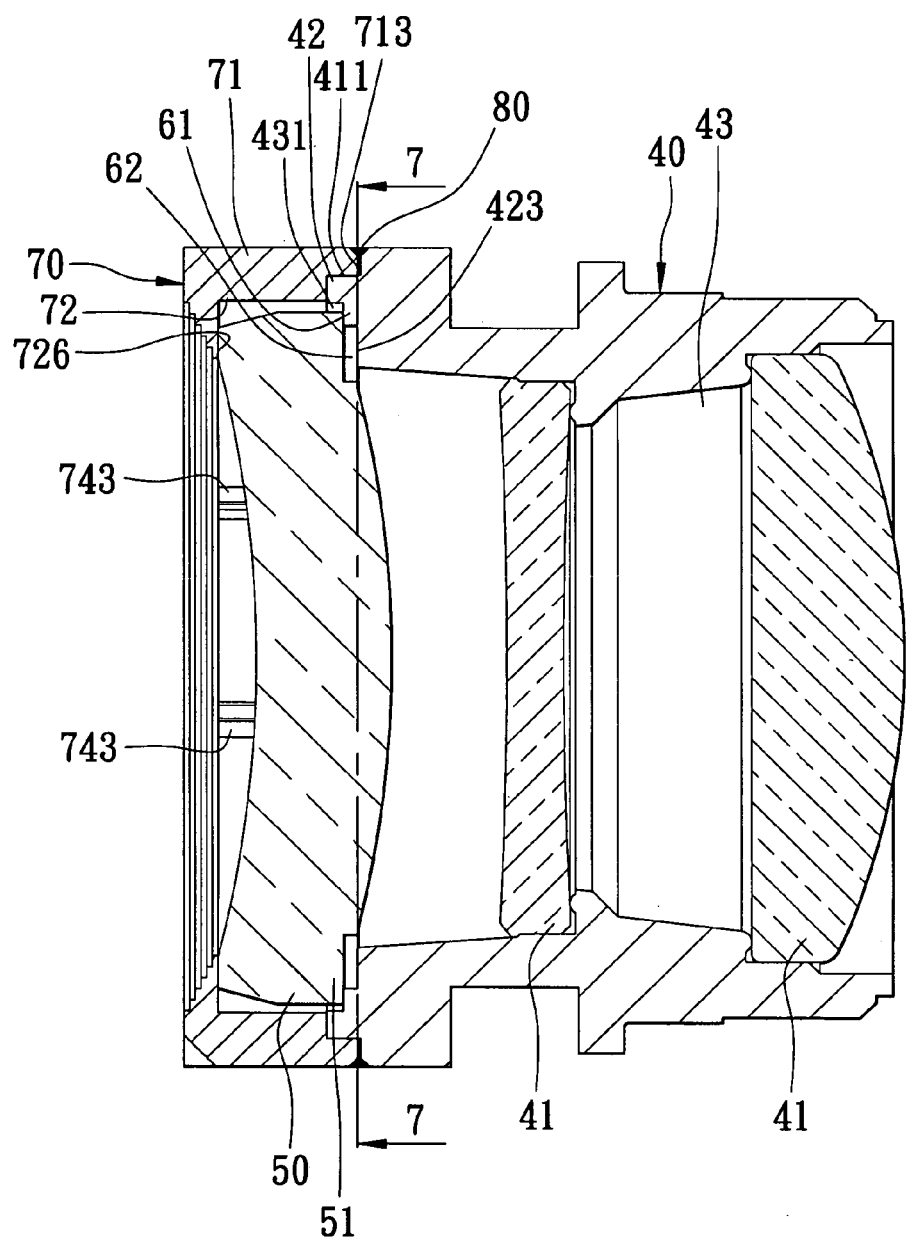
FIG. 6 is an assembled sectional view of the first preferred embodiment.

The lens 50 has a lens axis 500, and first and second lens portions 51, 52 opposite to each other along the lens axis 500 and formed respectively with first and second lens surfaces 511, 521. The first lens portion 51 is disposed in the lens-receiving compartment 431 such that the first lens surface 511 abuts against the lens-abutting surface 423, as best shown in FIG. 6. The first lens portion 51 has a radial dimension smaller than that of the inner peripheral surface 422. The second lens portion 52 further has a lens peripheral surface 522 that extends from the second lens surface 521 along the lens axis 500.

It should be noted herein that the lens barrel 40 has fixed lenses 41 mounted therein in this embodiment of the present invention. However, since the feature of this invention does not reside in the presence of the fixed lenses 41, they should not limit the scope of this invention.

Figure 7:
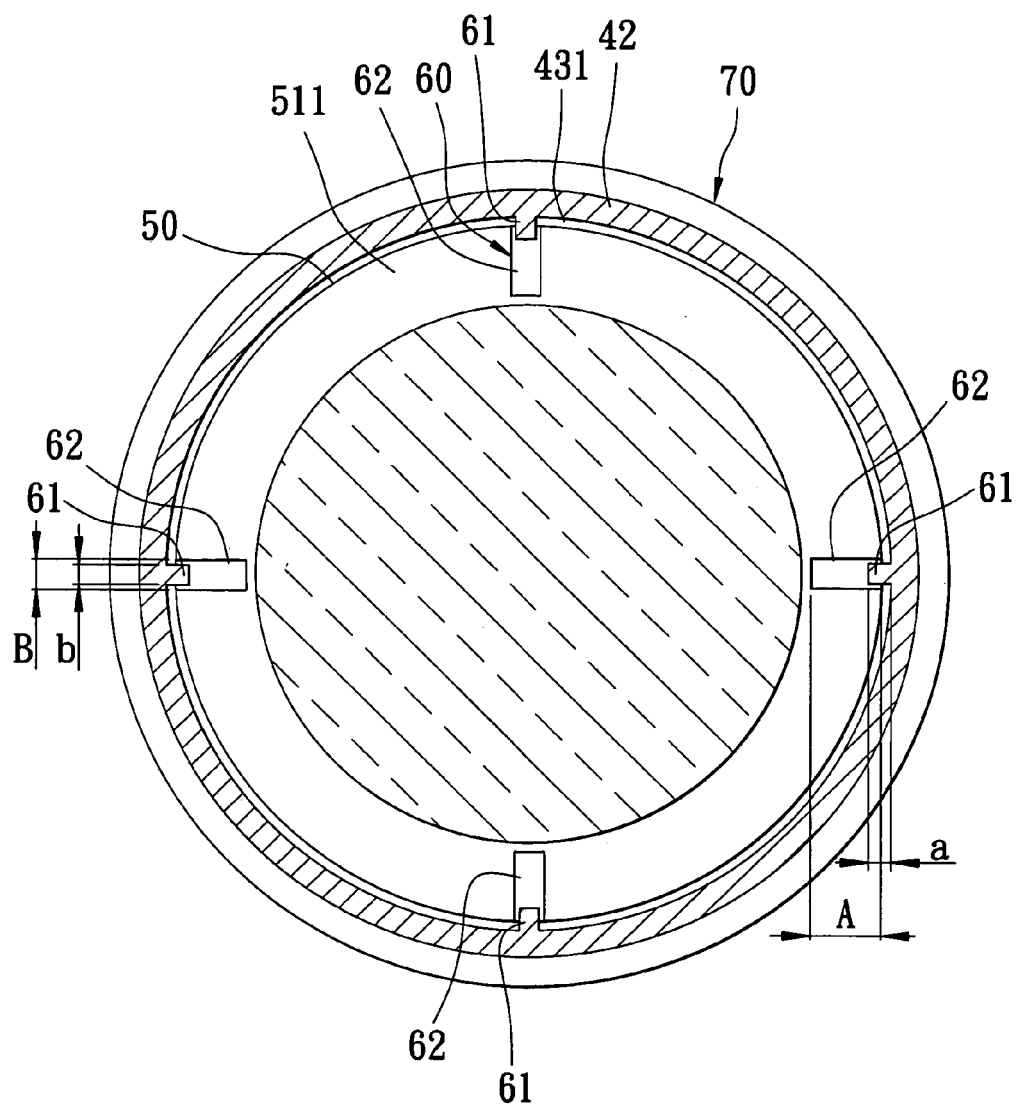
FIG. 7 is an assembled sectional view taken along line 7—7 in FIG. 6, illustrating a guiding unit in the first preferred embodiment.

As shown in FIG. 6 and FIG. 7, the guiding unit 60 includes a set of guiding studs 61 formed on the lens-abutting surface 423 and spaced apart angularly from each other (refer to FIG. 4), and a set of guiding slots 62 formed in the first lens surface 511 and spaced apart angularly from each other. It should be noted herein that the guiding studs 61 can be formed on either one of the first lens surface 511 and the lens-abutting surface 423, while the guiding slots 62 can be formed in the other of the first lens surface 511 and the lens-abutting surface 423 in other embodiments of the present invention. The guiding slots 62 receive the guiding studs 61 respectively therein, and have dimensions larger than those of the guiding studs 61 such that there is a clearance between each guiding stud 61 and the respective guiding slot 62.

In the first preferred embodiment, the guiding unit 60 includes four of the guiding slots 62 that are equiangularly spaced apart from each other, and four of the guiding studs 61 that are equiangularly spaced apart from each other. In addition, each of the guiding slots 62 has a radial length (A) and a circumferential width (B) larger than those (a), (b) of the respective one of the guiding studs 61.

Figure 3:
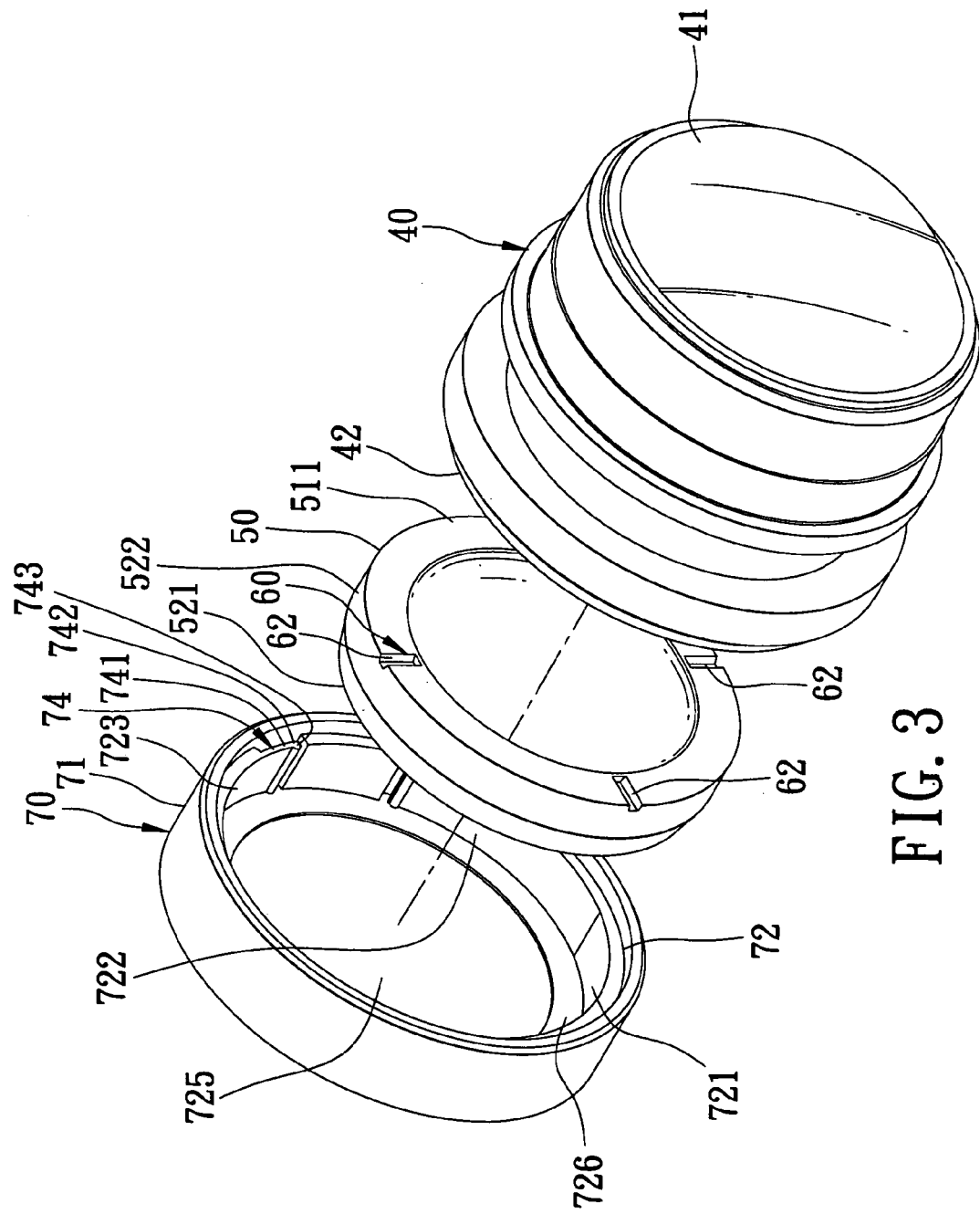
FIG. 3 is an exploded perspective view of the first preferred embodiment of a lens device according to the present invention.
Figure 4:
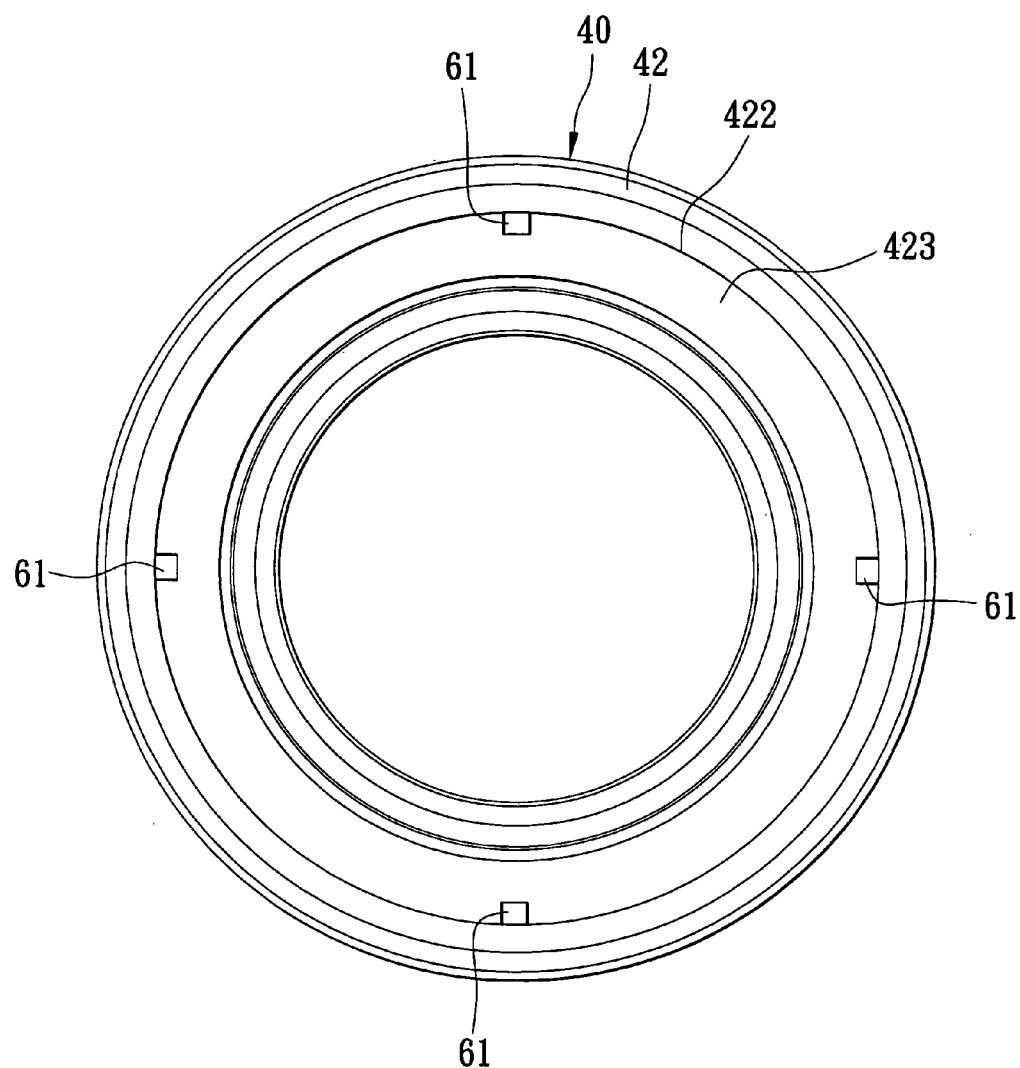
FIG. 4 is an end view of a lens barrel in the first preferred embodiment.
Figure 5:
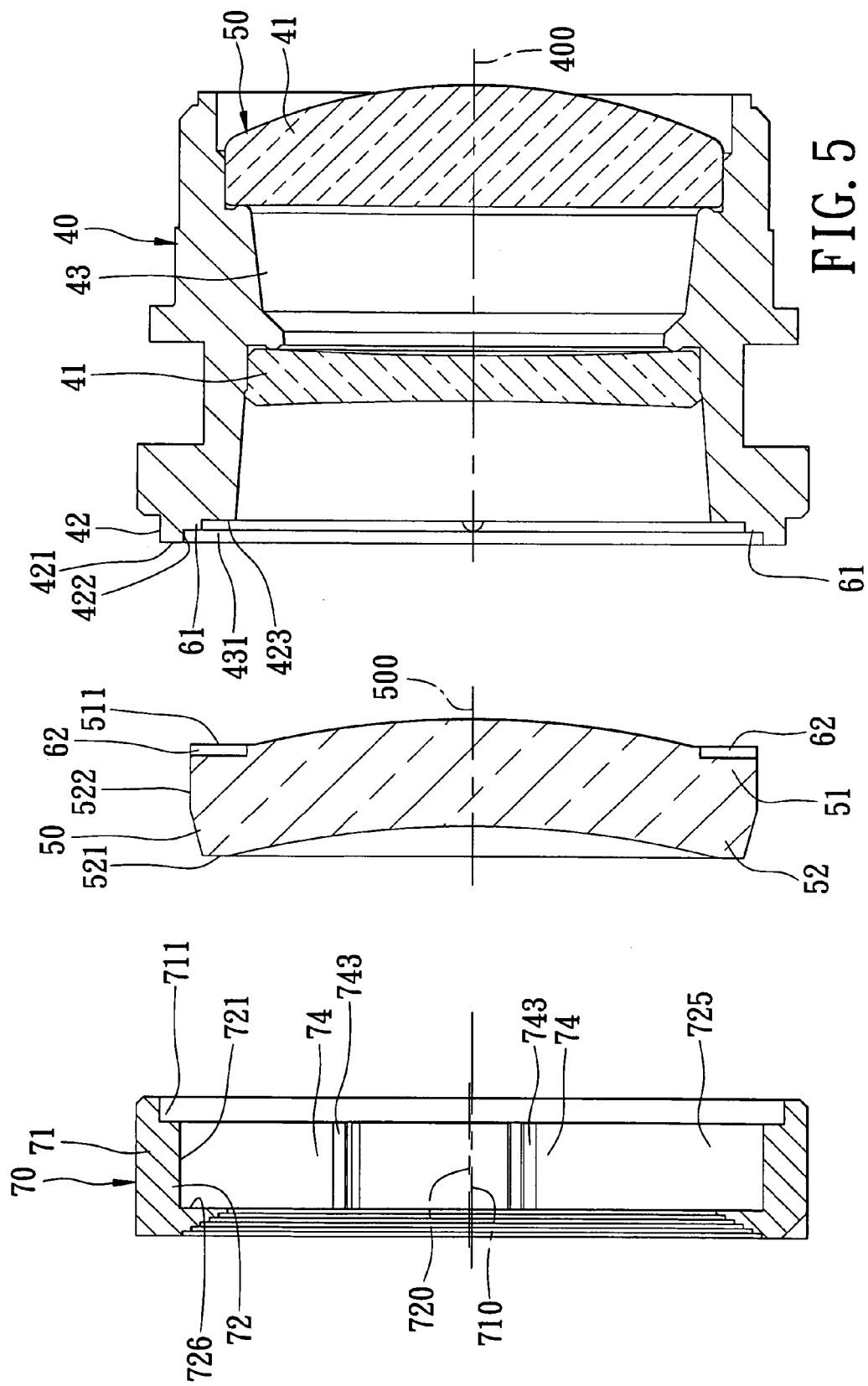
FIG. 5 is an exploded sectional view of the first preferred embodiment.

As shown in FIG. 3 and FIG. 5, the positioning unit 70 has an outer ring section 71 and an inner ring section 72 formed integrally in the outer ring section 71. The outer ring section 71 has a ring axis 710, and is sleeved on the end barrel section 42 of the lens barrel 40 such that the ring axis 710 is aligned with the barrel axis 400. The inner ring section 72 engages the lens peripheral surface 522 of the second lens portion 52 such that the lens axis 500 forms a radial offset with the ring axis 710. The position of the lens 50 in the lens-receiving compartment 431 relative to the barrel axis 400 is controlled by the inner ring section 72 according to angular orientation of the inner ring section 72 relative to the ring axis 710. This will be explained in grater detail in the succeeding paragraphs.

In the first preferred embodiment, the outer ring section 71 further has a sleeve segment 711 that extends in an axial direction relative to the ring axis 710 away from the inner ring section 72. The sleeve segment 711 is sleeved on the end barrel section 42 of the lens barrel 40 such that the ring axis 710 is aligned with the barrel axis 400.

The inner ring section 72 has a lens-engaging surface 721 that confines a lens-receiving hole 725 to receive the second lens portion 52 therein, and that engages the lens peripheral surface 522 of the second lens portion 52. The inner ring section 72 further has a lens-stopping surface 726 that abuts against the second lens surface 521 of the second lens portion 52 when the second lens portion 52 is received in the lens-receiving hole 725. The lens-receiving hole 725 has a hole axis 720 that is offset radially with the ring axis 710. The inner ring section 72 is discontinuous, and has first and second end parts 722, 723 spaced apart from each other in a circumferential direction relative to the hole axis 720.

The positioning unit 70 further includes at least one biasing member 74 that extends in the circumferential direction from a respective one of the first and second end parts 722, 723. In this embodiment, there are two biasing members 74 that abut against the lens peripheral surface 522 of the second lens portion 52 to urge the lens peripheral surface 522 toward the lens-engaging surface 721 of the inner ring section 72.

Each of the biasing members 74 includes a spring arm 741 connected to the respective one of the first and second end parts 722, 723 of the inner ring section 72. The spring arm 741 has a distal end 742 distal from the respective one of the first and second end parts 722, 723. Each of the biasing members 74 further includes a contact stub 743 formed on the distal end 742 of the spring arm 741 and disposed to contact the lens peripheral surface 522 of the second lens portion 52.

Figure 8:
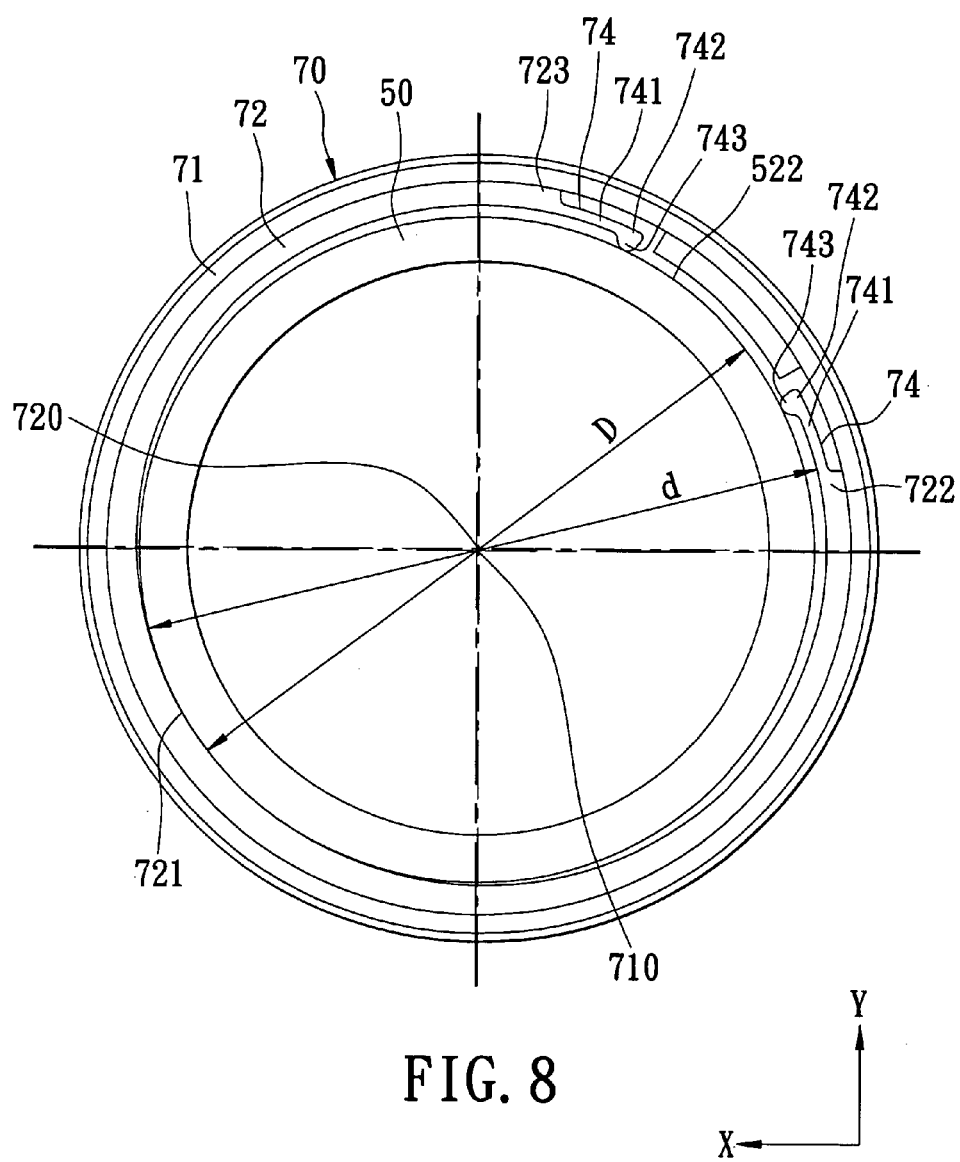
FIG. 8 is a fragmentary schematic view of the first preferred embodiment, illustrating a first state of a lens before axis correction.
Figure 9:
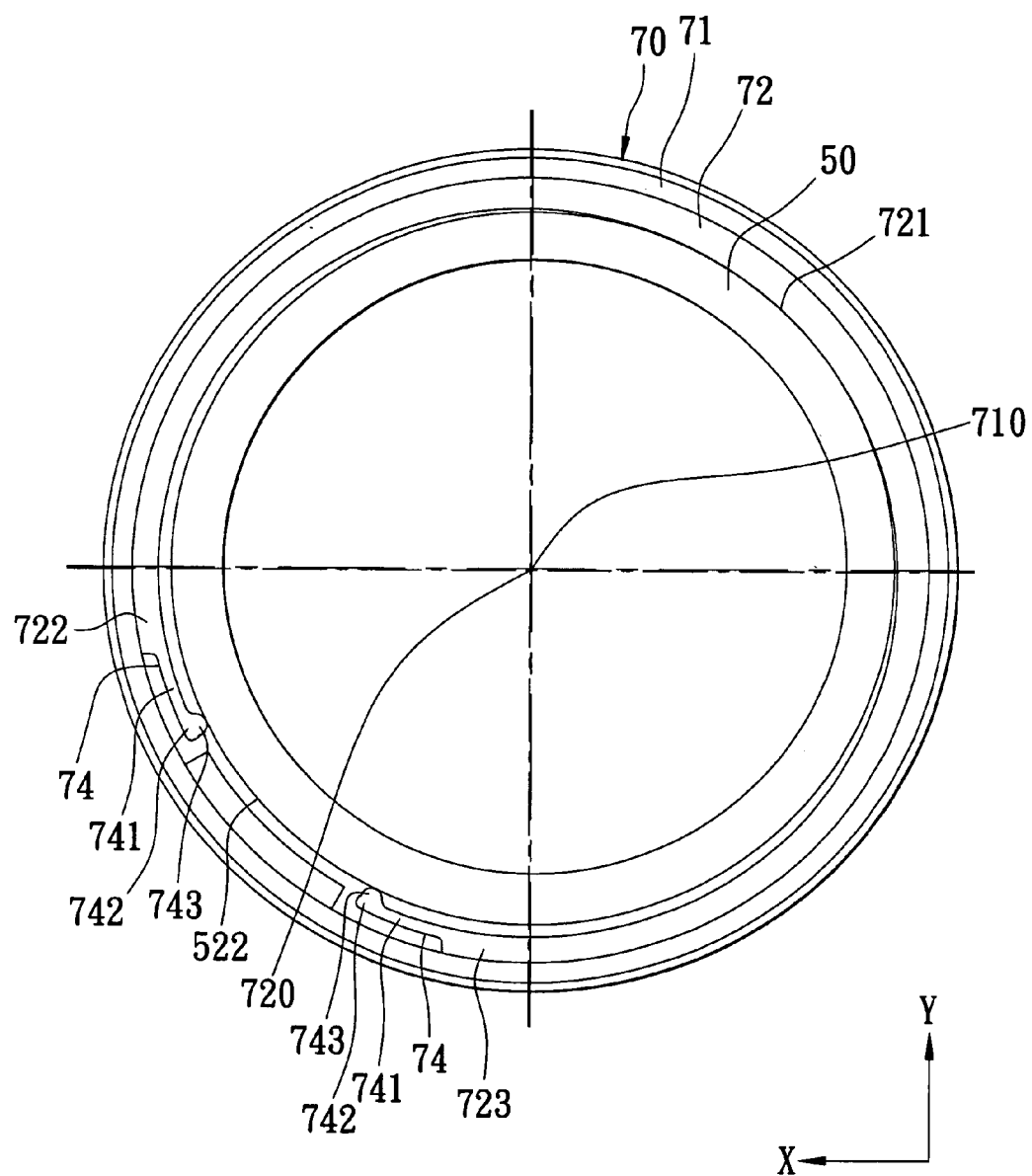
FIG. 9 is a fragmentary schematic view of the first preferred embodiment, illustrating a second state of the lens after axis correction.
Figure 10:
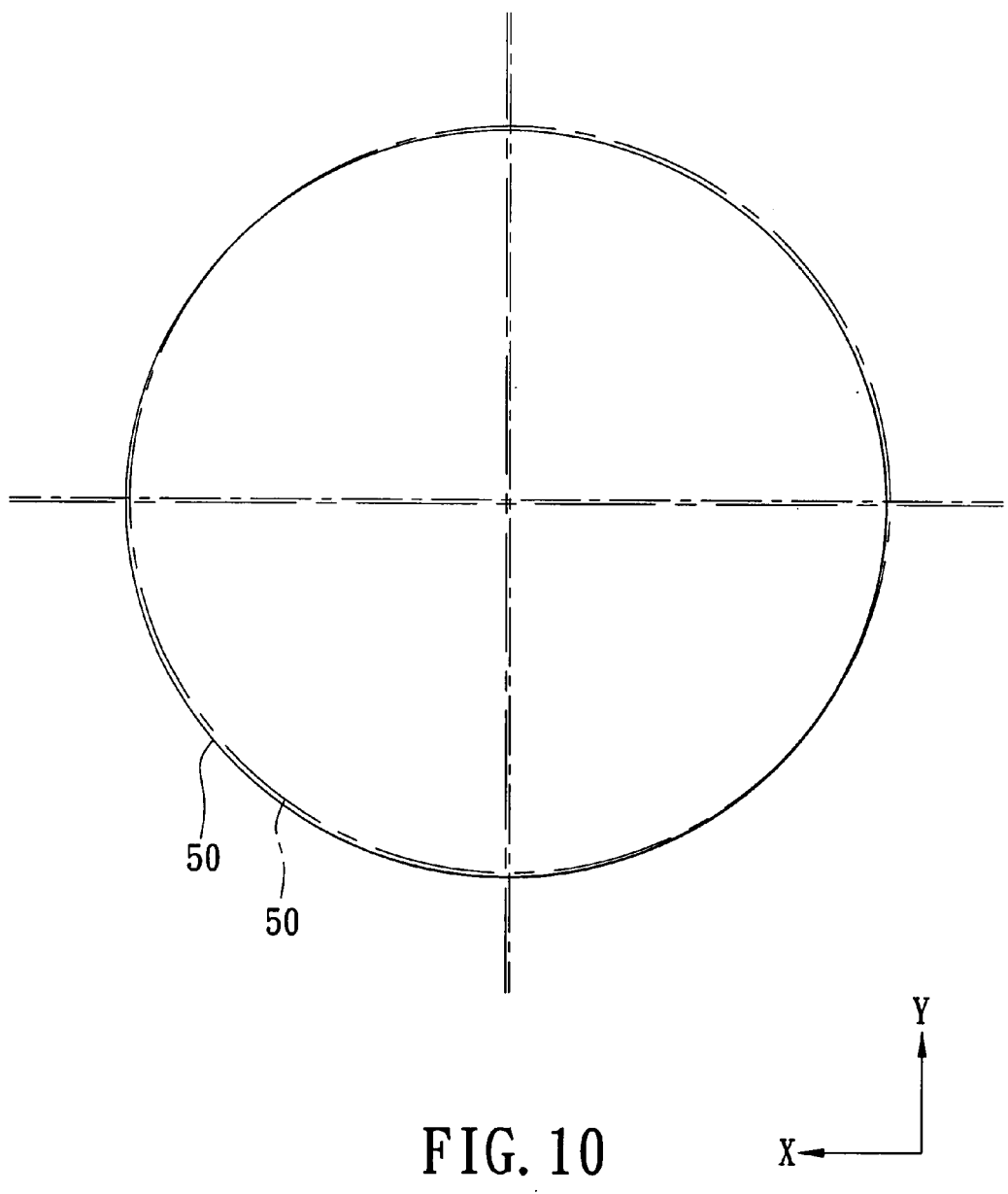
FIG. 10 is a track of the movement of the lens from the first state to the second state on an X-Y plane.

As shown in FIG. 8, in the first preferred embodiment, the lens 50 has a lens diameter (D) that is smaller than a diameter (d) of the lens-engaging surface 721 of the inner ring section 72. However, the lens diameter (D) can be smaller than or equal to the diameter (d) in other embodiments of this invention. The contact stubs 743 cooperate with the lens-engaging surface 721 of the inner ring section 72 to position the lens 50 in the lens-receiving hole 725.

As shown in FIG. 5, FIG. 6 and FIG. 7, to assemble the lens device, the first lens portion 51 of the lens 50 is disposed in the lens-receiving compartment 431 of the lens barrel 40 such that the first lens surface 511 abuts against the lens-abutting surface 423 of the end barrel section 42, and such that the guiding studs 61 formed on the lens-abutting surface 423 are received in the guiding slots 62 formed in the first lens surface 511 of the first lens portion 51. Next, the sleeve segment 711 of the outer ring section 71 of the positioning unit 70 is sleeved on the end barrel section 42 of the lens barrel 40, such that the ring axis 710 of the outer ring section 71 is aligned with the barrel axis 400 while the hole axis 720 of the inner ring section 72 is offset radially with the barrel axis 400. At this time, the second lens portion 52 of the lens 50 is received in the lens-receiving hole 725 such that the lens peripheral surface 522 of the second lens portion 52 abuts against the lens-engaging surface 721 of the inner ring section 72 and the contact stubs 743 of the biasing members 74, and that the second lens surface 521 abuts against the lens-stopping surface 726 of the inner ring section 72. At this time, the lens axis 500 of the lens 50 has a radial offset with the ring axis 710. The lens-stopping surface 726 of the inner ring section 72 cooperates with the lens-abutting surface 423 of the end barrel portion 42 to prevent movement of the lens 50 along the lens axis 500.

FIG. 6, FIG. 8, FIG. 9, and FIG. 10 illustrate axis correction for the first preferred embodiment through rotation of the positioning unit 70. Since the hole axis 720 of the inner ring section 72 and the lens axis 500 of the lens 50 are offset radially with the ring axis 710 of the outer ring section 71, rotation of the outer ring section 71 results in changes in the angular orientation of the inner ring section 72 relative to the ring axis 710. The guiding unit 60 disposed between the lens barrel 40 and the lens 50 permits movement of the lens 50 in the lens-receiving compartment 431 in radial directions relative to the barrel axis 400. Hence, when the positioning unit 70 rotates, the lens 50 moves along in (X) and (Y) directions in the lens-receiving compartment 431, thereby correcting position of the lens axis 500 relative to the ring axis 710.

Since the lens peripheral surface 522 of the second lens portion 52 constantly abuts against the lens-engaging surface 721 of the inner ring 72 and the contact stubs 743 of the biasing members 74, the lens 50 is positioned in the lens-receiving hole 725 of the inner ring section 72 and the lens-receiving compartment 431 of the lens barrel 40. To complete axis correction for the lens device, after the angular orientation of the lens axis 500 relative to the barrel axis 400 is positioned optimally, an adhesive 80 (see FIG. 6) is injected into a juncture of the lens barrel 40 and the outer ring section 71 to fix the positioning unit 70 to the lens barrel 40.

Figure 11:
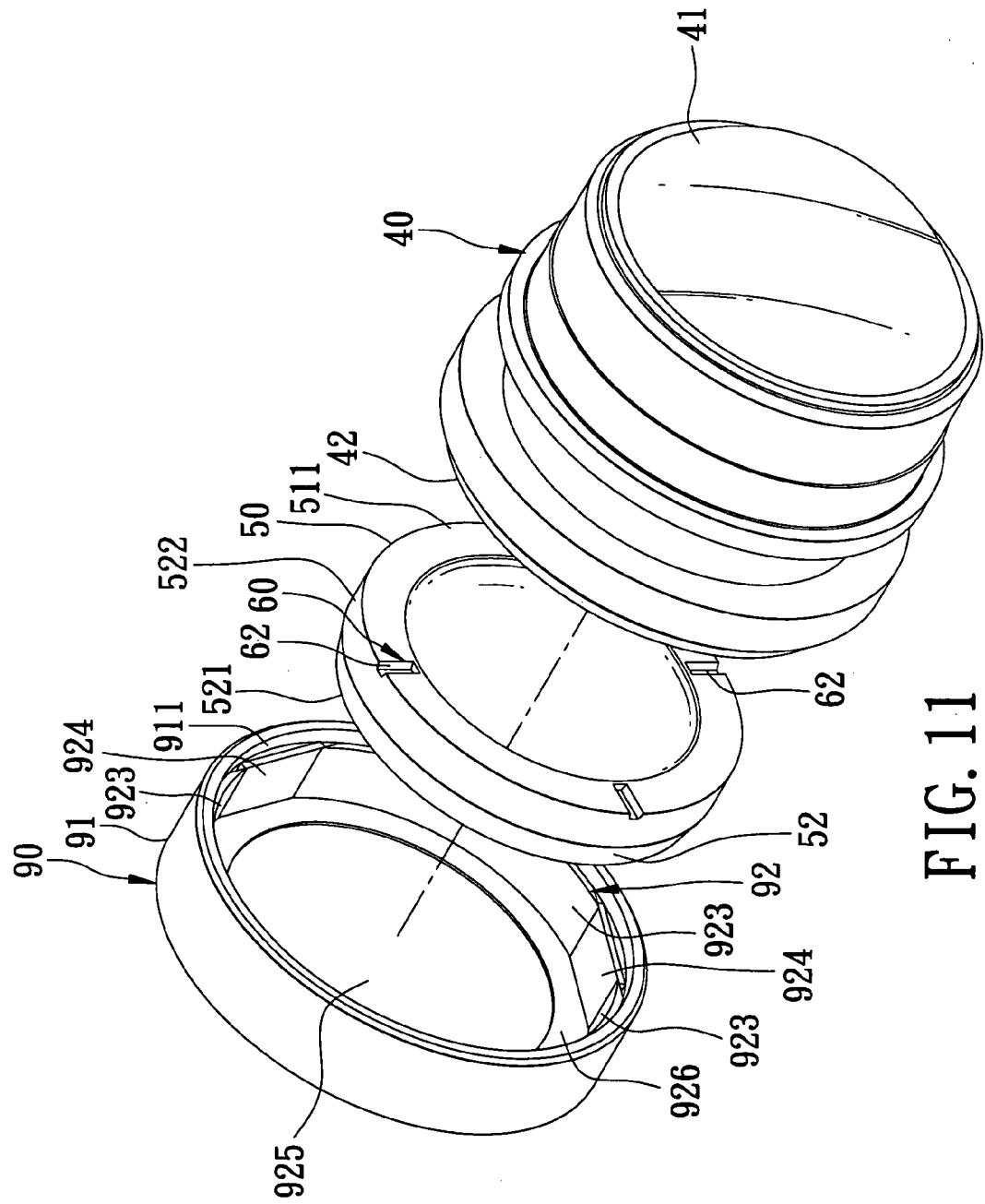
FIG. 11 is an exploded perspective view of the second preferred embodiment of a lens device according to the present invention.
Figure 12:
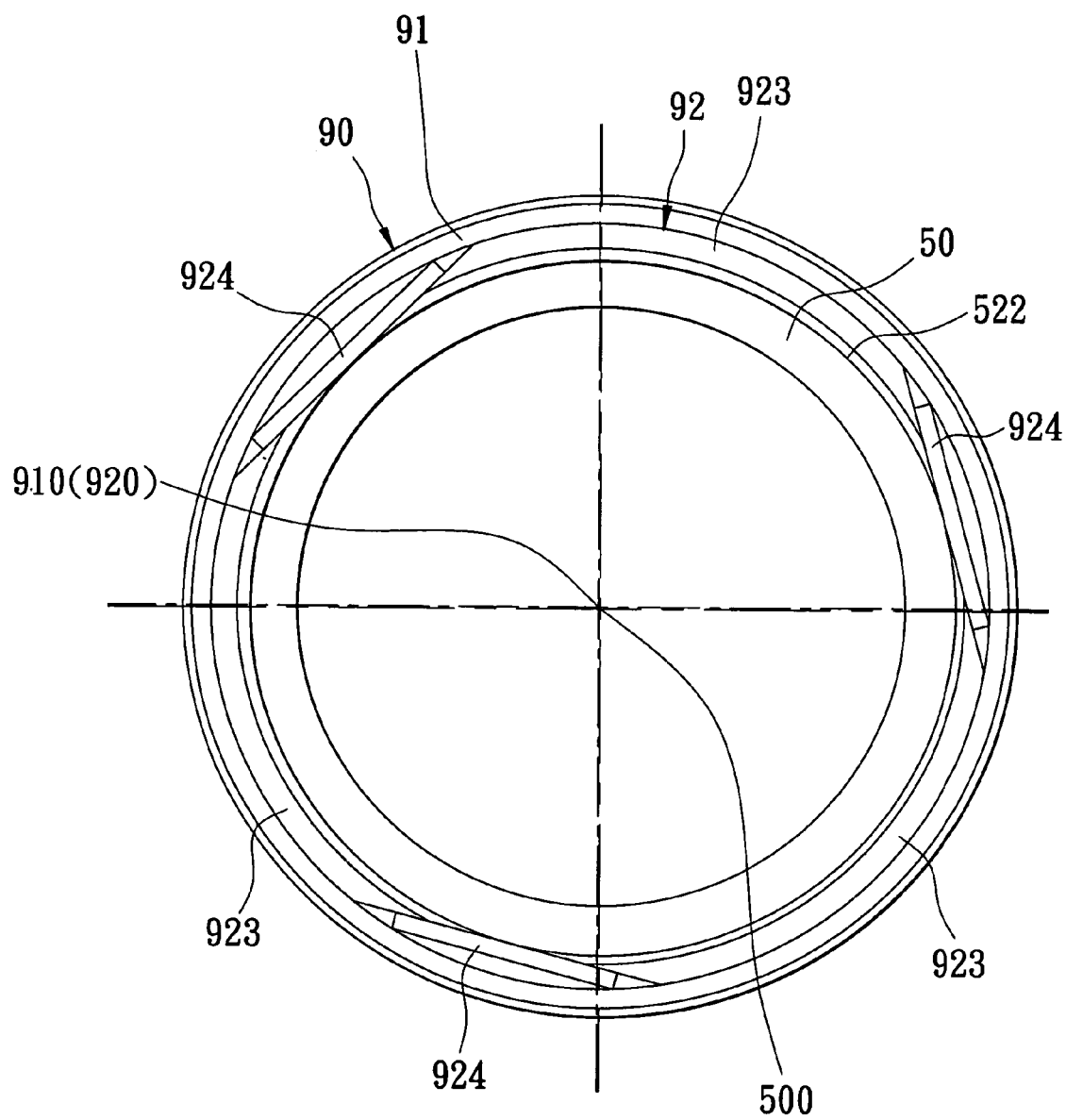
FIG. 12 is a fragmentary schematic view of the second preferred embodiment.

As shown in FIG. 11 and FIG. 12, the positioning unit 90 of the second preferred embodiment of a lens device according to the present invention includes an outer ring section 91 and an inner ring section 92. The outer ring section 91 has a ring axis 910, and a sleeve segment 911 that extends in an axial direction relative to the ring axis 910 away from the inner ring section 92 and that is sleeved on the end barrel section 42 of the lens barrel 40, such that the ring axis 910 is aligned with the barrel axis (not shown). The inner ring section 92 is formed integrally in the outer ring section 91, and confines a lens-receiving hole 925 to receive the second lens portion 52 of the lens 50 therein. The lens-receiving hole 925 has a hole axis 920 that is aligned with the ring axis 910, and a radial dimension larger than that of the second lens portion 52. The inner ring section 92 further has a lens-stopping surface 926 that abuts against the second lens surface 521 of the second lens portion 52 when the second lens portion 52 is received in the lens-receiving hole 925.

Unlike the previous embodiment, the inner ring section 92 is provided with a set of angularly spaced apart biasing members 924 that project into the lens-receiving hole 925 at different radial depths and that engage the lens peripheral surface 522 of the second lens portion 52 such that the lens axis 500 forms a radial offset with the ring axis 910. The inner ring section 92 further includes a set of spacer blocks 923 that project from the outer ring section 91 and that are angularly spaced apart from each other. In the second preferred embodiment, the inner ring section 92 is provided with three of the biasing members 924 and three of the spacer blocks 923. Each of the biasing members 924 extends between a respective adjacent pair of the spacer blocks 923.

The principle of axis correction for the lens device according to the second preferred embodiment is the same as that of the first preferred embodiment. In view of the arrangement of the biasing members 924, rotation of the positioning unit 90 relative to the lens barrel 40 changes the angular orientation of the biasing members 924, thereby resulting in radial movement of the lens 50 in the lens-receiving compartment (not shown) in the lens barrel 40.

The following are some of the advantages of the lens device according to the present invention:

1. No external tools, such as the lens-adjusting claws, are needed to perform axis correction for the lens device, thereby making the correction process more convenient and effective.

2. The adhesive 80 only needs to be injected into the juncture between the lens barrel 40 and the outer ring section 71 (91), such that flow of the adhesive 80 onto the effective area of the primary lens 14 is avoided.

3. The ring axis 710 (910) of the outer ring section 71 (91) of the positioning unit 70 (90) is constantly aligned with the barrel axis 400 after the outer ring section 71 (91) is sleeved on the lens barrel 40, such that alignment between the ring axis 710 (910) and the barrel axis 400 is maintained even after the injection of the adhesive 80. In addition, dislocation of the lens 50 due to fluidity of the adhesive 80 is prevented as well.

While the present invention has been described in connection with what is considered the most practical and preferred embodiments, it is understood that this invention is not limited to the disclosed embodiments but is intended to cover various arrangements included within the spirit and scope of the broadest interpretation and equivalent arrangements.

What is claimed is:

1. A lens device comprising:

a lens barrel confining a barrel hole that extends along a barrel axis, said lens barrel having an end barrel section, said end barrel section having an end surface disposed radially relative to the barrel axis, an inner peripheral surface extending from said end surface parallel to the barrel axis, and a lens-abutting surface extending from said inner peripheral surface in radial inward directions relative to the barrel axis, said lens-abutting surface cooperating with said inner peripheral surface to configure said barrel hole with a lens-receiving compartment;

a lens having a lens axis, and first and second lens portions opposite to each other along the lens axis and formed respectively with first and second lens surfaces, said first lens portion being disposed in said lens-receiving compartment such that said first lens surface abuts against said lens-abutting surface, said first lens portion having a radial dimension smaller than that of said inner peripheral surface, said second lens portion further having a lens peripheral surface that extends from said second lens surface along the lens axis;

a guiding unit including a set of guiding studs formed on one of said first lens surface and said lens-abutting surface and spaced apart angularly from each other, and a set of guiding slots formed in the other of said first lens surface and said lens-abutting surface and spaced apart angularly from each other, said guiding slots receiving said guiding studs respectively therein and having dimensions larger than those of said guiding studs; and a positioning unit having an outer ring section and an inner ring section formed in said outer ring section, said outer ring section having a ring axis and being sleeved on said end barrel section of said lens barrel such that the ring axis is aligned with the barrel axis, said inner ring section engaging said lens peripheral surface of said second lens portion such that the lens axis forms a radial offset with the ring axis, wherein position of said lens in said lens-receiving compartment relative to the barrel axis is controlled by said inner ring section according to angular orientation of said inner ring section relative to the ring axis.

2. The lens device as claimed in claim 1, wherein:

said inner ring section has a lens-engaging surface that confines a lens-receiving hole to receive said second lens portion of said lens therein, said lens-receiving hole having a hole axis that is offset radially with the ring axis; and said outer ring section has a sleeve segment that extends in an axial direction relative to the ring axis away from said inner ring section and that is sleeved on said end barrel section of said lens barrel.

3. The lens device as claimed in claim 2, wherein:

said lens-receiving hole has a radial dimension larger than that of said second lens portion;

said inner ring section being discontinuous and having first and second end parts spaced apart from each other in a circumferential direction relative to the hole axis;

said positioning unit further including at least one biasing member that extends in the circumferential direction from a respective one of said first and second end parts and that abuts against said lens peripheral surface of said second lens portion to urge said lens peripheral surface toward said lens-engaging surface of said inner ring section.

4. The lens device as claimed in claim 3, wherein said biasing member includes:

a spring arm connected to the respective one of said first and second end parts of said inner ring section, and having a distal end distal from the respective one of said first and second end parts; and a contact stub formed on said distal end of said spring arm and disposed to contact said lens peripheral surface of said second lens portion.

5. The lens device as claimed in claim 1, wherein:

said inner ring section confines a lens-receiving hole to receive said second lens portion of said lens therein, said lens-receiving hole having a hole axis that is aligned with the ring axis, and a radial dimension larger than that of said second lens portion;

said inner ring section being provided with a set of angularly spaced apart biasing members that project into said lens-receiving hole and that engage said lens peripheral surface of said second lens portion such that the lens axis forms the radial offset with the ring axis;

said outer ring section having a sleeve segment that extends in an axial direction relative to the ring axis away from said inner ring section and that is sleeved on said end barrel section of said lens barrel.

6. The lens device as claimed in claim 5, wherein:

said inner ring section includes three spacer blocks that project from said outer ring section and that are angularly spaced apart from each other;

said inner ring section being provided with three of said biasing members, each of which extends between a respective adjacent pair of said spacer blocks.

7. The lens device as claimed in claim 6, wherein said biasing members project into said lens-receiving hole at different radial depths.

8. The lens device as claimed in claim 1, wherein each of said guiding slots has a radial length and a circumferential width larger than those of the respective one of said guiding studs.

9. The lens device as claimed in claim 8, wherein said guiding unit includes four of said guiding slots that are equiangularly spaced apart from each other, and four of said guiding studs that are equiangularly spaced apart from each other.

10. The lens device as claimed in claim 1, further comprising an adhesive for fixing said positioning unit to said lens barrel.

* * * * *